United States Patent
Streuter et al.

(10) Patent No.: US 8,407,460 B1
(45) Date of Patent: *Mar. 26, 2013

(54) SYSTEM AND METHOD FOR A SOFTWARE APPLICATION TO DETERMINE IF THE STORAGE DEVICE AND THE OPERATING SYSTEM IS AN INTERNAL DRIVE OR AN EXTERNAL DRIVE

(75) Inventors: Gary W. Streuter, San Clemente, CA (US); Randall Deetz, Costa Mesa, CA (US); Jim Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,363

(22) Filed: May 21, 2012

Related U.S. Application Data

(63) Continuation of application No. 13/109,298, filed on May 17, 2011, now Pat. No. 8,185,730, which is a continuation of application No. 12/500,545, filed on Jul. 9, 2009, now Pat. No. 7,945,771.

(60) Provisional application No. 61/079,797, filed on Jul. 10, 2008.

(51) Int. Cl.
*G06F 15/177* (2006.01)
*G06F 9/24* (2006.01)
*G06F 9/00* (2006.01)

(52) U.S. Cl. .................... 713/2; 713/1; 713/100
(58) Field of Classification Search ................. 713/2
See application file for complete search history.

(56) References Cited

U.S. PATENT DOCUMENTS

| | | | |
|---|---|---|---|
| 5,379,431 A | 1/1995 | Lemon et al. | |
| 6,189,100 B1 | 2/2001 | Barr et al. | |
| 6,449,716 B1 | 9/2002 | Rickey | |
| 6,493,822 B1 | 12/2002 | Rafanello | |
| 7,073,013 B2 | 7/2006 | Lasser | |
| 7,293,166 B2 | 11/2007 | Nguyen et al. | |
| 7,373,442 B2 | 5/2008 | Seto | |
| 7,373,443 B2 | 5/2008 | Seto | |
| 7,664,836 B2 | 2/2010 | Kim | |
| 2007/0061818 A1 | 3/2007 | Williams et al. | |
| 2010/0070744 A1 | 3/2010 | Barry et al. | |

*Primary Examiner* — Suresh Suryawanshi
(74) *Attorney, Agent, or Firm* — Law Office of Scott C. Harris, Inc.

(57) ABSTRACT

Software program or application can determine if the storage device it was launched from is connected to the host computer system on an internal bus or an external bus. The ability of a software application to determine from where it and the operating system was launched allows it to perform a plurality of actions based on the launch location such as limiting the functionality of an application depending on its launch location. If a software company does not want its software to be installed or executed from an external drive or executed on multiple computers then it can limit the users ability to moved the software from one computer to another on a portable drive connected through a USB or IEEE-1394 port.

12 Claims, 3 Drawing Sheets

SYSTEM AND METHOD FOR A SOFTWARE APPLICATION TO DETERMINE IF THE STORAGE DEVICE AND THE OPERATING SYSTEM IS AN INTERNAL DRIVE OR AN EXTERNAL DRIVE

This application is a continuation application of U.S. Ser. No. 13/109,298 filed May 17, 2011, now U.S. Pat. No. 8,185,730 issued May 22, 2012, which is a continuation of U.S. Ser. No. 12/500,545 filed Jul. 9, 2009, now U.S. Pat. No. 7,957,771, which claims priority from application No. 61/079,797, filed Jul. 10, 2008, the entire contents of the disclosure of which is herewith incorporated by reference in their entirety.

BACKGROUND

Prior art exists that relates to programmatically determining which drive in a system is the boot drive. For example, this is often done by a boot program such as the There are several examples of methodologies on the internet that allow a user or implementer to programmatically determine the boot drive in a multi-drive computer system. The web site toward dot com, subdirectory cfsrexx/os2-mag/9701.htm contains a technical article showing one such methodology for the OS2 operating system. This article describes an application programming interface call of GetBootDriveO. This API call supersedes a previous API call of DosQuerySysinfoO. The older API call of DosQuerySysinfoO returned an ordinal number which can be converted into its corresponding drive letter (1-26=A-Z). The new API call of GetBootDriveO returns the drive letter in upper case of the drive that booted the operating system.

While the methodology described in the above article will identify the boot drive in the computer system is has two shortcomings addressed by aspects of the present disclosure. The article does not address the issue of the bus interface a boot drive or any other storage device is attached to either externally or internally to the computer system. The methodology in the article is targeted specifically to the OS2 operating system and not easily transferable to other operating systems. The present disclosure recognizes certain commonalities across a wide variety of operating systems including Windows, Unix, Linux, and MAC/OS which is a shell residing on top of Unix.

The article also makes use of batch files to determine the boot drive from a plurality of drives connected to the computer system. A batch file is a text file containing a series of commands intended to be executed by the command interpreter. Batch files are used across all popular operating systems such as Windows, MAC/OS. Batch files in Unix, and Linux based operating systems are normally referred to as shell scripts. When a batch file is run, the shell program that runs on top of the operating system providing an interface for the user (usually COMMAND.COM or cmd.exe) reads the file and executes its commands, normally line-by-line. Batch files are useful for running a sequence of executables automatically and are often used by system administrators to automate tedious processes.

The article on this web site provides examples of batch files that obtain the assigned boot file indicator, which is normally a letter, and places it into a variable that can be accessed by an application program or by the computer user. These batch file examples cover such operating systems as DOS, OS/2, Windows NT/4, Windows XP. The example shown for Windows XP gathers some additional information such as the boot disk indicator which is normally a number, the boot drive indicator which is normally a letter, and the \name of the boot partition contained on the boot drive.

Again, this article does not address the physical interface to which the boot drive is connected.

SUMMARY

The present disclosure provides a software method to determine if a software application was launched from an internally connected storage device or a storage device connected to a computer system over an external bus. An embodiment describes a software program used for the backup of operating system hard disk drives and for performing bare metal restore of those drives.

One exemplary embodiment allows an software application program to identify all drives with a valid operating system folder or sub directory, the assigned drive indicator which is normally a letter, and the interface to which the drive is connected.

BRIEF DESCRIPTION OF THE DRAWINGS

Embodiments of the present disclosure are illustrated by way of example, and not by way of limitation. The following figures and the descriptions both brief and the detailed descriptions of the disclosure refer to similar elements and in which.

DETAILED DESCRIPTION

Figure 1:
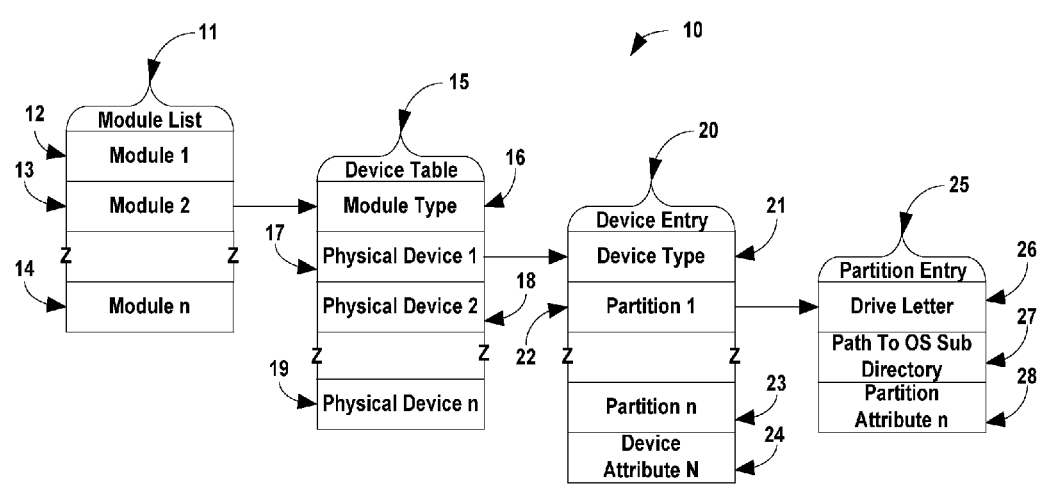
FIG. 1 depicts the data structure assembled by the disclosure to determine if the disclosure is running from the internal system hard disk drive or from an externally attached hard disk drive.

Now referencing FIG. 1, 10 depicts a set of data collected and arranged by an exemplary embodiment to determine the storage device holding the software application of an exemplary embodiment, and the operating system.

The data set depicted by reference 10 in FIG. 1 shows but one example from a plurality of such possible datasets where more or less or different defining data is collected and organized.

The software in 10 is executed by a computer to create a set of modules where a module contains data for a single physical interface from a plurality of possible interfaces that may be contained in the computer system on which the disclosure is being executed. These physical interfaces may be of a plurality of types such as an internal bus, USB bus, IEEE-1394 bus, PCMCIA, 802.11 wireless bus links, and other non-specified bus types.

Module List 11 describes a computer system with at least three physical busses that are described as Module 1 12, Module 2 13, and Module n 14. For the purposes of describing this embodiment, Module 2 13 is further defined in Device Table 15 which shows a list of physical devices connected to Module 2 13. In Device Table 15, entry Module Type 16 defines the actual type of physical interface for Module 2 13.

In this embodiment, there are at least 3 physical devices shown as Physical Device 1 17, Physical Device 2 18, and Physical Device n 19.

Device Entry 20 describes the storage attributes for Physical Device 1 17. In Device Entry 20, Device Type 21 defines the type of device as one of a plurality of possible devices such as a hard disk drive, CD ROM drive, flash memory drive, or other possible types of storage devices. In this depiction, Device Entry 20 contains descriptions of at least 3 partitions on the device defined as Partition 1 22, Partition 2 23, and Partition n 24. Device Entry 20 also contains at lease 1 additional attribute as Device Attribute n 24. In total, Device Entry 20 defines the attributes necessary to describe the type of device Physical Device 1 17 is as well as its physical attributes, electrical attributes, and partition attributes.

FIG. 1 shows Partition 1 22 in Device List 20 which is further described as Partition Entry 25. Partition Entry 25 has the drive indicator assigned by the operating system as Drive Letter 26, the path to the operating system folder or subdirectory where the operating system is installed as Path To Operating System 27, and at least one additional attribute describing additional partition attributes as Partition Attribute n 28.

In total, data structure 10 contains all of the information necessary for the software application containing the disclosure to determine if the operating system was launched from a storage device connected to the computer system via the internal bus or via an external bus.

Figure 2:
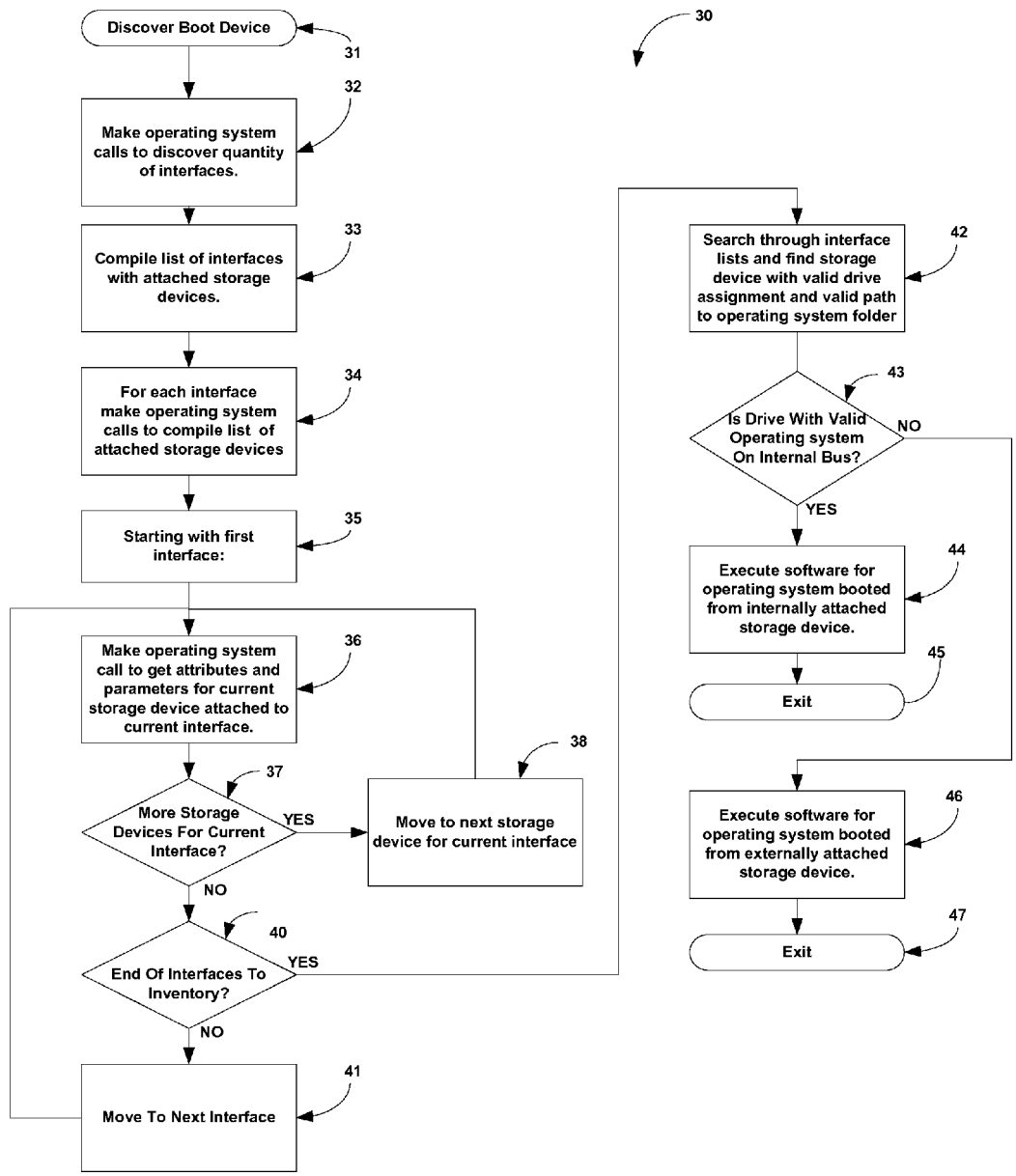
FIG. 2 is a flowchart depicting the logic flow used by the disclosure to compile a list of all storage interfaces and attached storage devices.

Now referencing FIG. 2, where 30 is the flowchart that describes how the disclosure constructs data list 10 shown in FIG. 1. Once the operating system is booted from a storage device attached to either the internal bus of the computer system or attached to an external bus of the computer system the disclosure will be launched either manually by the user or automatically by the operating system.

The operation executes the flowchart on a computer. This begins execution at program entry point 31. Process block 32, makes operating system calls to discover quantity of interfaces, will execute a series of calls to the operating system. These calls are typically made as low level or IOCTL calls which is an acronym for "Input/output control". IOCTLs are typically employed to allow userspace software to communicate with hardware devices or operating system kernel components. The disclosure makes use of the IOCTL calls to inventory the different interfaces contained in or attached to the computer system. Operating systems such as Windows, MAC-OS, OS-2, UNIX, and Linux all have provisions for IOCTL calls.

Construction of the list of interfaces is performed by process block 33, which compiles a list of interfaces with attached storage devices. Process block 33 uses IOCTL calls to generate a list of interfaces, then passes control to process block 34, For each of the plural interfaces, 34 makes operating system calls to compile the list of attached storage devices thereby compiling a list storage devices attached to each of the interfaces.

The storage devices may be of any type of electronic storage device such as hard disk drives, flash memory drives, optical storage drives, or other types of storage devices.

After process block 34 has compiled the list of attached storage devices for each interface, control passes to process block 35.

Process block 35, starting with first interface, is the beginning of a control loop where the attributes for each storage device attached to each of the interfaces are collected and saved in data set 10 depicted in FIG. 1.

The first block of the control loop is process block 36, which makes an operating system call to get attributes and parameters for current storage device attached to current interface. Process block 36 makes a series of IOCTL calls to the operating system to obtain the attributes and parameters associated with a single physical storage device. Process block 36 requests and collects a plurality of attributes such as device type, number of partitions, assign drive letter or name, path to the operating system sub directory or folder if present, and other attributes.

The data collected by process block 36 is shown in FIG. 1 as Device Entry 20. In different embodiments of the disclosure, the amount of data collected by process block 36 may be the same or different and may contain more or less data as needed by the specific implementation of the disclosure.

After process block 36 has completed gathering data for the current physical storage device, control passes to Decision Block 37, More Storage Devices For Current Interface? If there are more physical storage devices attached to the interface currently being inventoried then control is passed to process block 38, Move to next storage device for current interface, after which control will be passed to process block 36 so that the next physical storage device can be inventoried. If there are not more physical storage devices attached to the interface currently being inventoried then control will be passed to decision block 40, End Of Interfaces To Inventory? If the current interface is not the last interface then control will be passed to process block 41, Move To Next Interface, after which control will be passed to process block 36 where the physical storage devices attached to the next interface will be inventoried.

If the current interface was the last interface, then control is passed to process block 42, which Searches through interface lists to find storage device with valid drive assignment and valid path to operating system folder. Process block 42 searches data list 10 shown in FIG. 1. Once the boot drive for the system is found, process block 42 then examines device entry 20 to see if there is a valid drive assignment and a valid path to OS sub directory. If this entry is found to contain a path to the OS sub directory, the disclosure will make an operating system call to retrieve the current boot drive and path to the OS sub directory.

If the current drive and path to the OS sub directory match the drive assignment and path to the OS sub directory of current device entry 20 then the drive identified in device entry 20 is the boot drive and control will be passed to decision block 43. This query will be made for each device entry 20 found to contain a path to OS sub directory 27 entry, because there may be multiple storage devices attached to the various interfaces for a computer where more than one of the storage devices may have been used for a boot drive at some point in time.

If module type 16 contained in device table 15 for the current module in module list 11 indicates that the interface type is the internal bus then control will be passed to process block 44, Execute software for operating system booted from internally attached storage device. Process block 44 will execute that portion of the disclosure's software meant to be executed if the operating system was booted from an internally attached drive or storage device after which the program will exit at exit point 45. If module type 16 contained in device table 15 for the current module in module list 11 indicates that the interface type is an external bus then control will be passed to process block 46, Execute software for operating system booted from externally attached storage device. Process 46 will execute that portion of the disclosure's software meant to be executed if the operating system was booted from an externally attached drive or storage device after which the program will exit at exit point 47.

Figure 3:
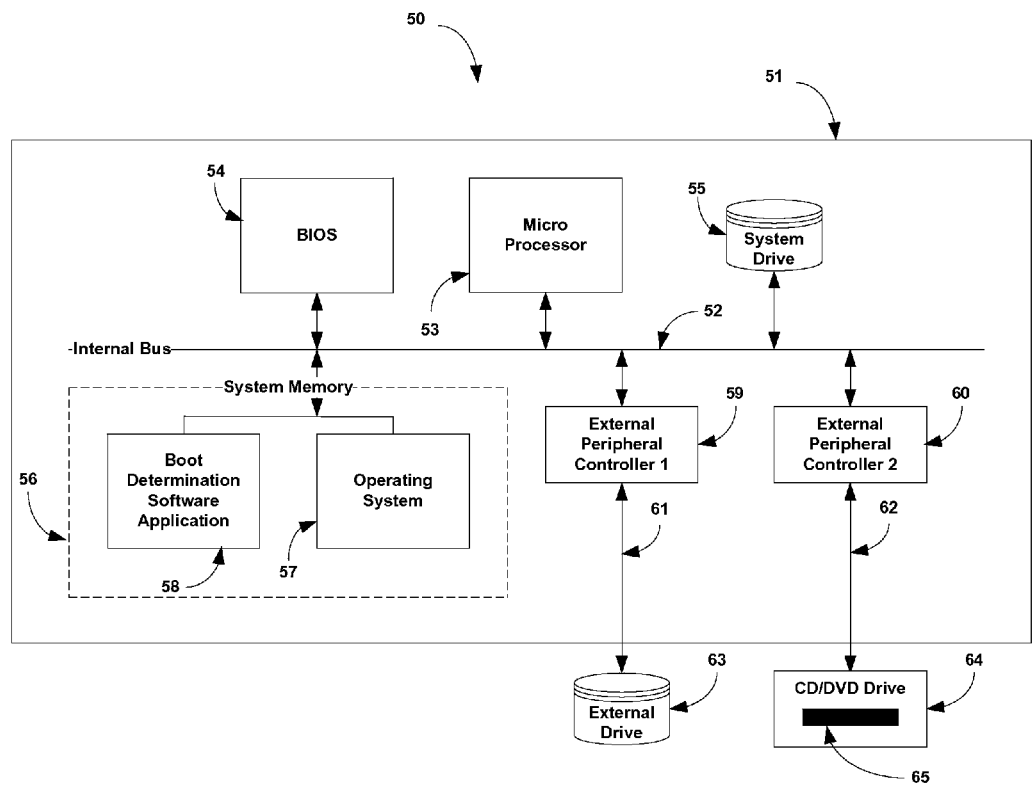
FIG. 3 depicts a software application on a computer system that uses the disclosure to determine if it is running off of an internal system disk drive or off of an externally booted system disk drive.

Now referencing FIG. 3 where 50 depicts a computer system 51 where the disclosure will be used. Computer System 51 contains micro processor 53, BIOS 54, internal bus 52, system memory 56, system drive 55, and external peripheral controller 1 59 and external peripheral controller 2 60. In this depiction of the exemplary embodiment, external peripheral controller 1 59 and external peripheral controller 2 60 can support any of a plurality of external busses such as but not limited to USB, IEEE-1364, Firewire, SATA or PCMCIA.

In this exemplary embodiment, a software application will have created a backup image of system drive 55 on External Drive 63. This assumes that at some point in time after a backup image of system drive 55 was transferred to external drive 63.

BIOS (basic input/output system) 54 contains a set of software used by microprocessor 53 for determining which hard disk drive contains the operating system that will be loaded and executed. BIOS 54 also contains a text based user interface application that can be invoked at boot time by the user to specify the order in which drives are examined for an operating system. Typically BIOS 54 will direct micro processor 53 to first attempt booting an operating system from system drive 55. During the boot process, microprocessor 53 will transfer operating system 57 from system drive 55 to system memory 56 then transfer control to operating system 57 residing in system memory 56.

In operation, one might assume system drive 55 has suffered a catastrophic corruption, e.g., a failure or an OS corruption. At this point, the boot order is changed, to boot from the backup drive. For example, this can be done by the user having invoked the text based user interface contained in BIOS 54 to change the boot order such that microprocessor 53 will first attempt to load a valid operating system from external drive 63. Once operating system 57 has been booted from external drive 63, boot determination software application 58 is loaded either by the user or automatically by the operating system and starts executing.

Boot determination software application 58 constructs a dataset depicted as 10 in FIG. 1. Once boot determination software application 58 has constructed dataset 10, it will examine each of the module entries contained in module list 11.

For each module where module type 16 indicates that module type 16 is of an interface type not consistent with internal bus 52, boot determination software application 58 further examines each of the device entries shown as physical device 1 17 through physical device n 19. For each physical device entry where device type 21 is a storage device, boot determination software application 58 examines partition entry 25 for each partition. If any partition is assigned a drive letter and contains a valid path to OS subdirectory 27, boot determination software application 58 makes an operating system call to retrieve the current boot drive and path to the OS subdirectory. If the current drive and path to the OS subdirectory matches the drive assignment and path to the OS subdirectory of current device entry 20, then boot determination software application 58 examines the module type 46. If the module type is determined not to be the internal bus, boot determination software application 58 concludes that operating system 57 was booted from an external drive.

In one embodiment, boot determination software application 58 determines that operating system 57 was booted from external drive 63. When this determination is made, the software presents the user with a dialog box asking the user if he wants to move an image of external drive 63 onto system drive 55, thereby creating a bootable image on system drive 55.

In another embodiment, boot determination software application 58 determines that operating system 57 was booted from external drive 63, and then examines system drive 55 to determine the cause of system drive 55 not being bootable. After this examination, boot determination software application 58 presents a dialog box to the user informing the user that system drive 55 has an electrical problem and needs to be replaced or that system drive 55 has a software fault. The software presents a plurality of options such as fixing the software fault or moving an image of external drive 63 onto system drive 55 thus correcting the booting problem.

In another embodiment, boot determination software application 58 determines that operating system 57 was booted from external drive 63. It then informs the user that it can only be executed from an internal system drive.

In another embodiment, CD/DVD drive 64 has removable optical media 65 with an image of the operating system and software applications. The transferred applications include the boot determination software application 58. In this embodiment, the user alters the boot preference of computer system 51 such that it boots from CD/DVD drive 63. In this embodiment, boot determination software application 58 will, after determining that operating system was booted from CD/DVD drive 64, execute any software functions it was programmed to execute if the operating system was booted from a drive other than internal system drive 55. The boot determination software application 58 may allow the user to place an image of the operating system and software applications onto new disk drives instead of formatting new disk drives with the operating system disk formatter, thus saving time in creating bootable system drives.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the disclosure describes certain kinds and forms of busses, this disclosure can be used with other forms and kinds of busses.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro controller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system comprising:
    a processor running instructions for initially polling interfaces of the computer, to determine a list of storage devices on both an internal bus and an external bus, then operating to determine if an internal drive on the internal bus has a valid path to an operating system, and if so, to boot from the internal drive, and if no drive on the internal bus has the valid path to the operating system, then booting from an external drive connected to the external bus, and also transferring, based on user input, an image including an operating system from the external drive on to said internal drive connected to the internal bus without formatting the internal drive on the internal bus, where said transferring creates a bootable image on said internal drive.

2. The system as in claim 1, where said image also includes a backup of software and files.

3. The system as in claim 1, where when said processor boots from said internal drive, said processor creates and/or updates said image on said external drive, based on information on said internal drive.

4. The system as in claim 1, where said processor determines a software fault provides an option to transfer the operating system from the external drive on to the internal drive connected to the internal bus without formatting the internal drive on the internal bus as said user input.

5. The computer system as in claim 1, wherein said processor operates on determining that said operating system was booted from said external drive, to automatically examine said internal drive to determine a cause of said internal drive not being bootable, and to provide options to the user for said user input, based on said cause of said internal drive not being bootable.

6. A computer system as in claim 1, wherein said instructions for polling operate to inventory each of a plurality of physical storage devices, by inventorying a storage device interface, then moving to next storage device for a current interface, until a last interface is inventoried.

7. A computer system comprising:
    a processor running instructions for operating to determine if an internal drive on an internal bus is bootable, and if so, to boot from the internal drive, and if no drive on the internal drive is bootable, then determining if an external drive on an external bus is bootable, and if so, booting from the external drive connected to the external bus and also determining a reason why the internal drive was not bootable, and based on said reason, providing options to a user interface for correcting said reason, said options including a first option for a software error for transferring an image including an operating system from the external drive on to the internal drive connected to the internal bus without formatting the internal drive on the internal bus, where said transferring creates a bootable image on said internal drive, and a second option for replacing the internal drive.

8. The system as in claim 7, where said image also includes a backup of software and files.

9. The system as in claim 7, further comprising instructions for determining a list of storage devices on both an internal drive and an external drive of the computer system, wherein said instructions for polling operate to inventory each of a plurality of physical storage devices, by inventorying a storage device interface, then moving to next storage device for a current interface, until a last interface is inventoried.

10. A computer product comprising a series of non-transitory, executable instructions, that when executed, implement a program, said executable instructions comprising: instructions for operating to determine if an internal drive on an internal bus is bootable, and if so, to boot from the internal drive, determining if no internal drive on the internal bus is bootable, and determining if an external drive on an external bus is bootable, and if so, booting from the external drive connected to the external bus and also determining a reason why the internal drive was not bootable, and based on said reason, providing options to a user interface for correcting said reason, said options including a first option for a software error for transferring an image including an operating system from the external drive on to the internal drive connected to the internal bus without formatting the internal drive on the internal bus, where said transferring creates a bootable image on said internal drive, and a second option for replacing the internal drive.

11. The system as in claim 10, where said image also includes a backup of software and files.

12. The system as in claim 10, further comprising instructions for determining a list of storage devices on both an internal drive and an external drive of a computer system, wherein said instructions for polling operate to inventory each of a plurality of physical storage devices, by inventorying a storage device interface, then moving to next storage device for a current interface, until a last interface is inventoried.

* * * * *